US012744972B2

(12) United States Patent
Dutta et al.

(10) Patent No.: US 12,744,972 B2
(45) Date of Patent: Sep. 22, 2026

(54) GENERATING CORRECTED SIMULATIONS USING VIDEO GENERATION MODELS

(71) Applicant: GDM Holding LLC, Mountain View, CA (US)

(72) Inventors: Praneet Dutta, Sunnyvale, CA (US); Medhini Narasimhan, London (GB); Timo Immanuel Denk, Zürich (CH); Ishaan Malhi, Sunnyvale, CA (US)

(73) Assignee: GDM Holding LLC, Mountain View, CA (US)

( * ) Notice: Subject to any disclaimer, the term of this patent is extended or adjusted under 35 U.S.C. 154(b) by 61 days.

(21) Appl. No.: 18/901,340

(22) Filed: Sep. 30, 2024

(65) Prior Publication Data

US 2026/0095632 A1 Apr. 2, 2026

(51) Int. Cl.
*H04N 21/81* (2011.01)
*G06T 7/20* (2017.01)
*G06V 20/70* (2022.01)

(52) U.S. Cl.
CPC ............. *H04N 21/816* (2013.01); *G06T 7/20* (2013.01); *G06V 20/70* (2022.01); *G06T 2207/30241* (2013.01)

(58) Field of Classification Search
CPC ......... H04N 21/816; G06V 20/70; G06T 7/20
See application file for complete search history.

(56) References Cited

U.S. PATENT DOCUMENTS 11,189,189 B2 * 11/2021 Rosolio .................. G06F 3/013
11,869,236 B1 1/2024 Callari
12,488,569 B2 * 12/2025 Evans .................. G06V 10/774
2017/0294135 A1 * 10/2017 Lechner .................. G09B 9/32
2021/0141986 A1 * 5/2021 Ganille .................. G06N 3/04
2024/0135618 A1 4/2024 Zhang et al.

(Continued)

FOREIGN PATENT DOCUMENTS

CN 112529895 A 3/2021

OTHER PUBLICATIONS

Adiwardana et al., "Towards a Human-like Open-Domain Chatbot," CoRR, Submitted on Feb. 27, 2020, arXiv:2001.09977v3, 38 pages.

(Continued)

*Primary Examiner* — Mulugeta Mengesha

(74) *Attorney, Agent, or Firm* — Fish & Richardson P.C.

(57) ABSTRACT

Methods, systems, and apparatus, including computer programs encoded on a computer storage medium, for generating corrected simulations using video generation models. One of the methods includes obtaining an input video including a sequence of frames depicting a state transition of an environment that does not meet a state transition criterion; generating, based on a frame from a sequence of frames that depicts an incorrect end state of the state transition, a synthetic ending frame depicting a corrected end state of the state transition; and processing an input including one or more key frames from sequence of frames of the input video and the synthetic ending frame depicting the corrected end state of the state transition using a video generation model to generate an output video depicting a synthetic state transition of the environment that meets the state transition criterion.

20 Claims, 5 Drawing Sheets

(56) References Cited

U.S. PATENT DOCUMENTS

2025/0119624 A1 * 4/2025 Oh ....................... H04N 21/816

OTHER PUBLICATIONS

Avrahami et al., "Blended diffusion for text-driven editing of natural images," Paper, Presented at Proceedings of the IEEE/CVF conference on computer vision and pattern recognition, New Orleans, LA, USA, Jun. 18-24, 2022, pp. 18208-18218.
Brown et al., "Language Models are Few-Shot Learners," CoRR, Submitted on Jul. 22, 2020, arXiv:2005.14165v4, 75 pages.
Doersch et al. "TAPIR: Tracking Any Point with Per-Frame Initialization and Temporal Refinement," Paper, Presented at Proceedings of the IEEE/CVF International Conference on Computer Vision, Paris, France, Oct. 1-6, 2023, pp. 10061-10072.
Donahue, "Label-Conditioned Next-Frame Video Generation with Neural Flows," CoRR, Submitted on Oct. 15, 2019, arXiv:1910.11106v1, 9 pages.
aviationsafetymagazine.com [online], "Fixing Your Bounce," Jan. 27, 2019, retrieved on Oct. 23, 2024, retrieved from URL <https://www.aviationsafetymagazine.com/features/fixing-your-bounce/>, 7 pages.
Hoffmann et al., "Training Compute-Optimal Large Language Models," CoRR, Submitted on Mar. 29, 2022, arXiv:2203.15556v1, 36 pages.
Huang et al., "VBench: Comprehensive Benchmark Suite for Video Generative Models," CoRR, Submitted on Nov. 29, 2023, arXiv:2311.17982v1, 28 pages.
boldmethod.com [online], "9 Approach To Landing Problems, And How To Recover From Each One," Apr. 13, 2021, retrieved on Oct. 23, 2024, retrieved from URL <https://www.boldmethod.com/blog/lists/2021/04/nine-approach-to-landing-problems-and-how-to-recover-from-each-one/>, 13 pages.
Ling et al., "EditGAN: High-Precision Semantic Image Editing," Paper, Presented at the 35th Conference on Neural Information Processing Systems (NeurIPS 2021), Virtual Conference, Dec. 6-14, 2021; Advances in Neural Information Processing Systems, Jun. 10, 2021, 1249:16331-163345.
MuJoCo.org [online], "MuJoCo, Advanced physics simulation," 2021, retrieved on Sep. 20, 2024, retrieved from URL <https://mujoco.org/>, 3 pages.
Rae et al., "Scaling Language Models: Methods, Analysis & Insights from Training *Gopher*," CoRR, Submitted on Dec. 8, 2021, arXiv:2112.11446v1, 118 pages.
Raffel et al., "Exploring the Limits of Transfer Learning with a Unified Text-to-Text Transformer," CoRR, Submitted on Oct. 24, 2019, arXiv:1910.10683v2, 53 pages.
Tulyakov et al., "MoCoGAN: Decomposing Motion and Content for Video Generation," CoRR, Submitted on Dec. 14, 2017, arXiv:1707.04933v2, 13 pages.
Wikipedia.org [Online], Microsoft Flight Simulator (2020 video game), Mar. 11, 2024, retrieved on Sep. 20, 2024, retrieved from URL <https://en.wikipedia.org/wiki/Microsoft_Flight_Simulator_(2020_video game)>, 30 pages.
Yu et al., "Recurrent Deconvolutional Generative Adversarial Networks with Application to Text Guided Video Generation," CoRR, Submitted on Aug. 13, 2020, arXiv:2008.05856v1, 11 pages.
Zeng et al., "Make Pixels Dance: High-Dynamic Video Generation," CoRR, Submitted on Nov. 18, 2023, arXiv:2311.10982v1, 11 pages.
Extended Search Report in European Appln. No. 25200473.4, mailed on Feb. 10, 2026, 9 pages.
Innamorati et al., "Neural Re-Simulation for Generating Bounces in Single Images," 2019 IEEE/CVF International Conference on Computer Vision (ICCV), Oct. 27, 2019, pp. 8718-8727.

* cited by examiner

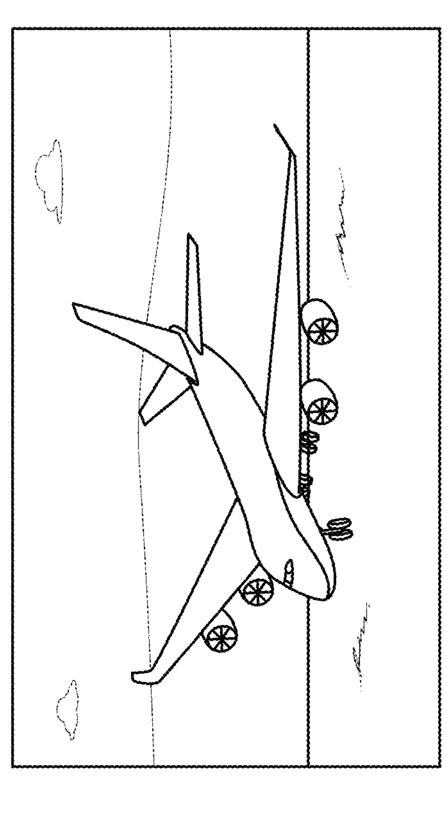
FIG. 2B
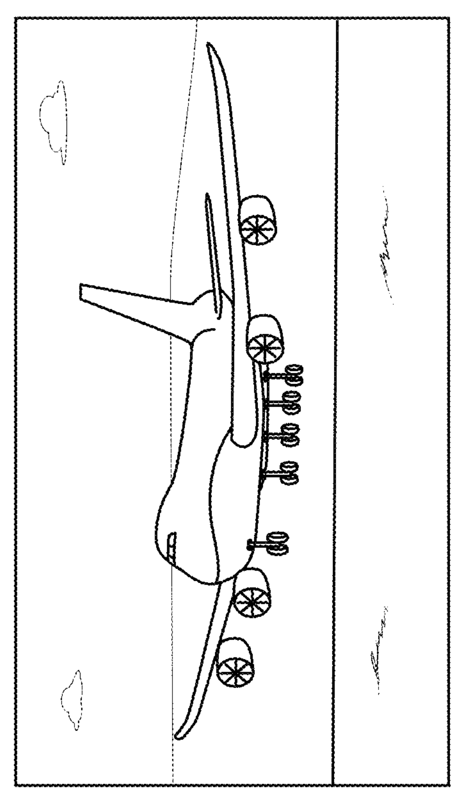
FIG. 2D
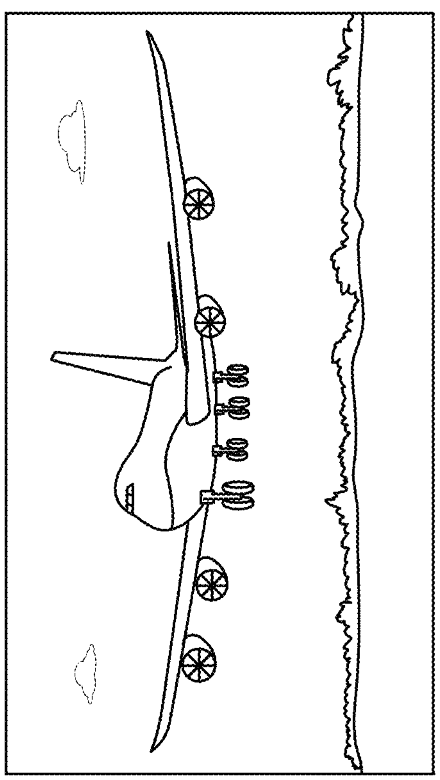
FIG. 2A
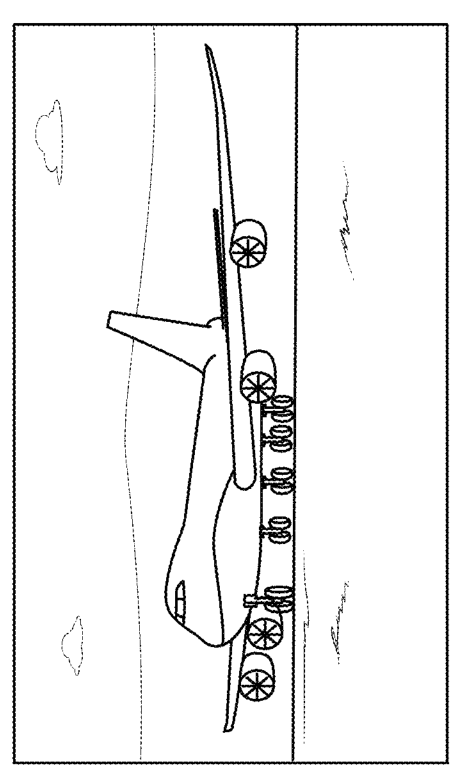
FIG. 2C

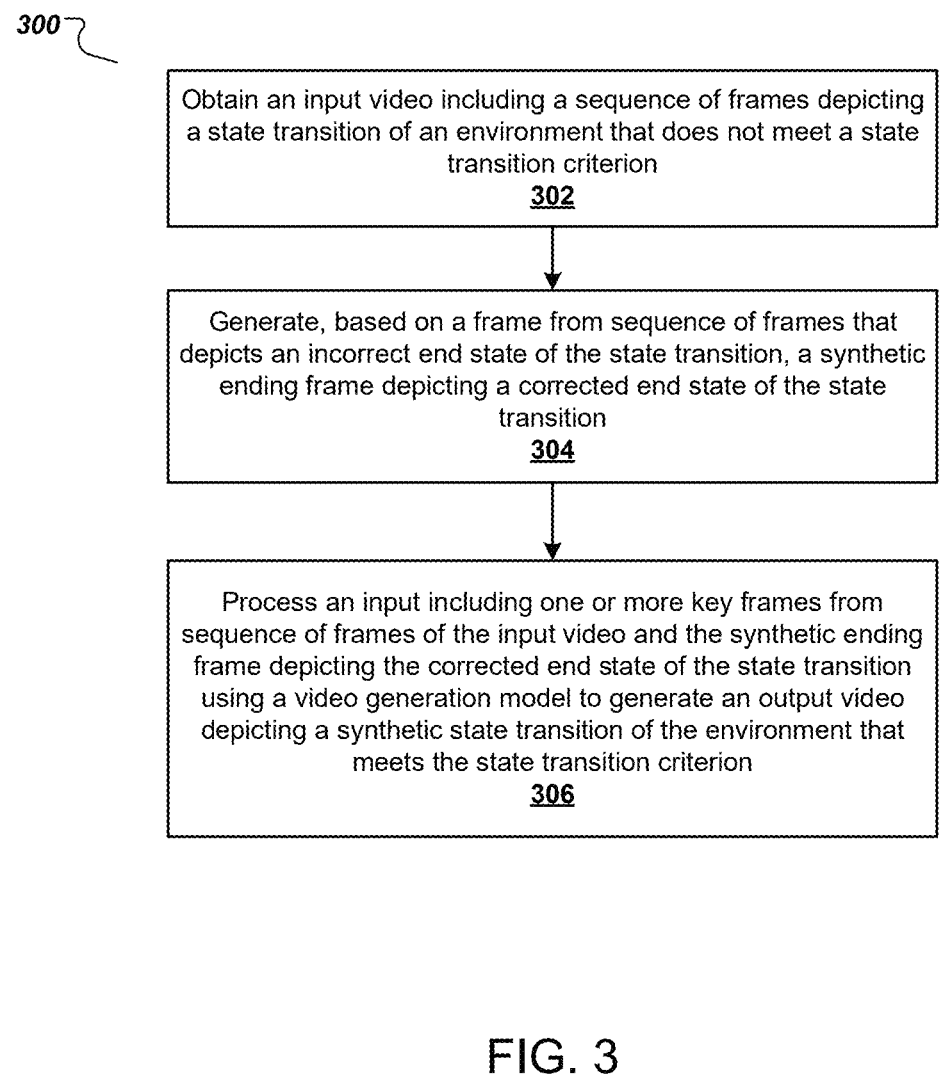

300

Obtain an input video including a sequence of frames depicting a state transition of an environment that does not meet a state transition criterion
302

Generate, based on a frame from sequence of frames that depicts an incorrect end state of the state transition, a synthetic ending frame depicting a corrected end state of the state transition
304

Process an input including one or more key frames from sequence of frames of the input video and the synthetic ending frame depicting the corrected end state of the state transition using a video generation model to generate an output video depicting a synthetic state transition of the environment that meets the state transition criterion
306

FIG. 3

GENERATING CORRECTED SIMULATIONS USING VIDEO GENERATION MODELS

BACKGROUND

This specification generally relates to generating simulations of an environment.

Simulations can be used to safely and cost-effectively study complex systems, predict outcomes, and train in realistic scenarios without real-world risks. Simulations can enhance learning, improve problem-solving, and help in planning and decision-making.

For example, flight simulators are important tools for student pilots and can simulate different flight conditions and environments that pilots will most likely encounter, without risks associated with flying real aircrafts. Student pilots can use flight simulators to learn flight maneuvers, such as climbing, descending, ascending, landing, taking off, and turning.

Traditional simulations rely on complex and computationally expensive physics engines that require extensive pre-programming and parameter tuning. Thus, these traditional simulations that rely on physics engines may not have the flexibility to generate simulations for complex scenarios or to adapt to user-defined objectives. Further, these traditional simulations may not be able to efficiently generate simulations for these complex scenarios or these user-defined objectives.

SUMMARY

This specification describes systems and techniques for generating corrected simulations using video generation models. In particular, given a video depicting an undesired outcome, e.g., an unstable landing of an aircraft, the systems and techniques described herein can generate a corrected video depicting a desired outcome, e.g., a stable landing. Thus, the systems and techniques can provide real-time feedback and analysis during simulations and can enhance training and learning experiences using the video simulations.

In general, one innovative aspect of the subject matter described in this specification can be embodied in methods that include the actions of obtaining an input video including a sequence of frames depicting a state transition of an environment that does not meet a state transition criterion; generating, based on a frame from a sequence of frames that depicts an incorrect end state of the state transition, a synthetic ending frame depicting a corrected end state of the state transition; and processing an input including one or more key frames from sequence of frames of the input video and the synthetic ending frame depicting the corrected end state of the state transition using a video generation model to generate an output video depicting a synthetic state transition of the environment that meets the state transition criterion.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The actions include processing the sequence of the frames of the input video using a visual language model to generate a respective state annotation for each frame in the sequence of the frames of the input video; and determining the one or more key frames from the sequence of the frames of the input video based on the respective state annotations for the sequence of the frames of the input video. The sequence of the frames of the input video includes a transition frame, wherein the state transition of the environment depicted in the transition frame and frames in the input video before the transition frame meets the state transition criterion, and the state transition of the environment depicted in frames in the input video after the transition frame does not meet the state transition criterion. The input to the video generation model includes the transition frame. The input to the video generation model includes one or more frames that precede the transition frame. The actions include processing an input including at least the frame that depicts the incorrect end state of the state transition using an image editing model to generate the synthetic ending frame depicting the corrected end state of the state transition. The one or more key frames include a starting frame depicting the environment before the state transition happens, and the actions include obtaining a set of points on the starting frame; obtaining a target trajectory for the set of points associated with a target condition of the environment; and processing the input including the starting frame, the synthetic ending frame, and the target trajectory for the set of points using the video generation model to generate the output video that meets the state transition criterion and is conditioned on the starting frame, the synthetic ending frame, and the target trajectory for the set of points, wherein a first frame of the output video is the starting frame, a last frame of the output video is the synthetic ending frame, and locations for the set of points in at least some frames of the output video approximately follow the target trajectory. The actions include generating control data for controlling one or more objects in the environment that causes the one or more objects to follow respective trajectories for each of the one or more objects depicted in the output video. The state transition of the environment includes a landing or a takeoff of an aircraft. The actions further include: obtaining a set of points on an object in the environment on a starting frame of the output video; processing the output video using a point tracking model to generate trajectories for the set of points in the output video; and generating an evaluation result for the output video based on the trajectories for the set of points in the output video. Generating the evaluation result for the output video includes: determining that at least one trajectory of the trajectories for the set of points in the output video is discontinuous; and in response to determining that at least one trajectory of the trajectories for the set of points in the output video is discontinuous, generating the evaluation result for the output video indicating that the output video has an error. Generating the evaluation result for the output video includes: determining a difference value between the trajectories for the set of points in the output video and reference trajectories for the set of points generated by a simulation engine that is based on one or more laws of physics; and determining whether the trajectories for the set of points in the output video meet the one or more laws of physics based on whether the difference value is less than a threshold.

Particular embodiments of the subject matter described in this specification can be implemented so as to realize one or more of the following advantages.

Rather than relying on complex programming and parameter tuning of physics engines, the systems and methods described in this specification can provide a flexible and efficient approach to generate video simulations that can adapt to complex scenarios and user-defined objectives. Using video generation models that are trained on real-world data, the videos generated using the video generation models for the simulations can exhibit high fidelity and can realistically capture a target system's behavior under various environmental conditions for various scenarios. Given an input video depicting an undesired outcome, e.g., an unstable landing of an aircraft, the systems and techniques described herein can generate a corrected video depicting a desired outcome, e.g., a trajectory correction corresponding to a stable landing, in real-time. Side-by-side comparison of the videos before and after the correction can provide effective feedback and improve training effectiveness. In some implementations, besides generating the corrected video depicting a desired outcome, the systems and techniques can generate control data for controlling an object in the environment. The systems can automatically use the control data to control the object to follow a trajectory as depicted in the corrected video. In some implementations, the systems can display the control data to a user such that the user can efficiently learn ways to control the object to achieve a desired outcome.

In some implementations, the systems and techniques described herein can generate a video depicting an undesired outcome. For example, given an input image or an input video depicting an aircraft that has lost its landing gear on touchdown, the systems and techniques can generate an output video depicting the trajectory of the aircraft that would lead to the result in the input image or video. In some implementations, systems and techniques described herein can generate video simulations under a range of possible values for one or more parameters of the environment. For example, the systems and techniques can generate a video depicting a landing of an aircraft with different wind strengths. As another example, given an input video depicting a desired output, e.g., the opponent not being able to get a tennis ball in a tennis match, the systems and techniques can generate a video depicting a trajectory of the tennis ball showing how far to one side the tennis ball needs to be played for the opponent to be unable to get it.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A illustrates an example starting frame of an input video.

FIG. 2B illustrates an example ending frame depicting an undesired landing of an aircraft.

FIG. 2C illustrates an example synthetic ending frame depicting a desired landing of an aircraft.

FIG. 2D illustrates an example intermediate frame of an output video generated by a video generation model conditioned on the starting frame in FIG. 2A and the synthetic ending frame in FIG. 2C.

FIG. 3 is a flow chart of an example process for generating corrected video simulation using video generation models.

Like reference numbers and designations in the various drawings indicate like elements.

DETAILED DESCRIPTION

Figure 1:
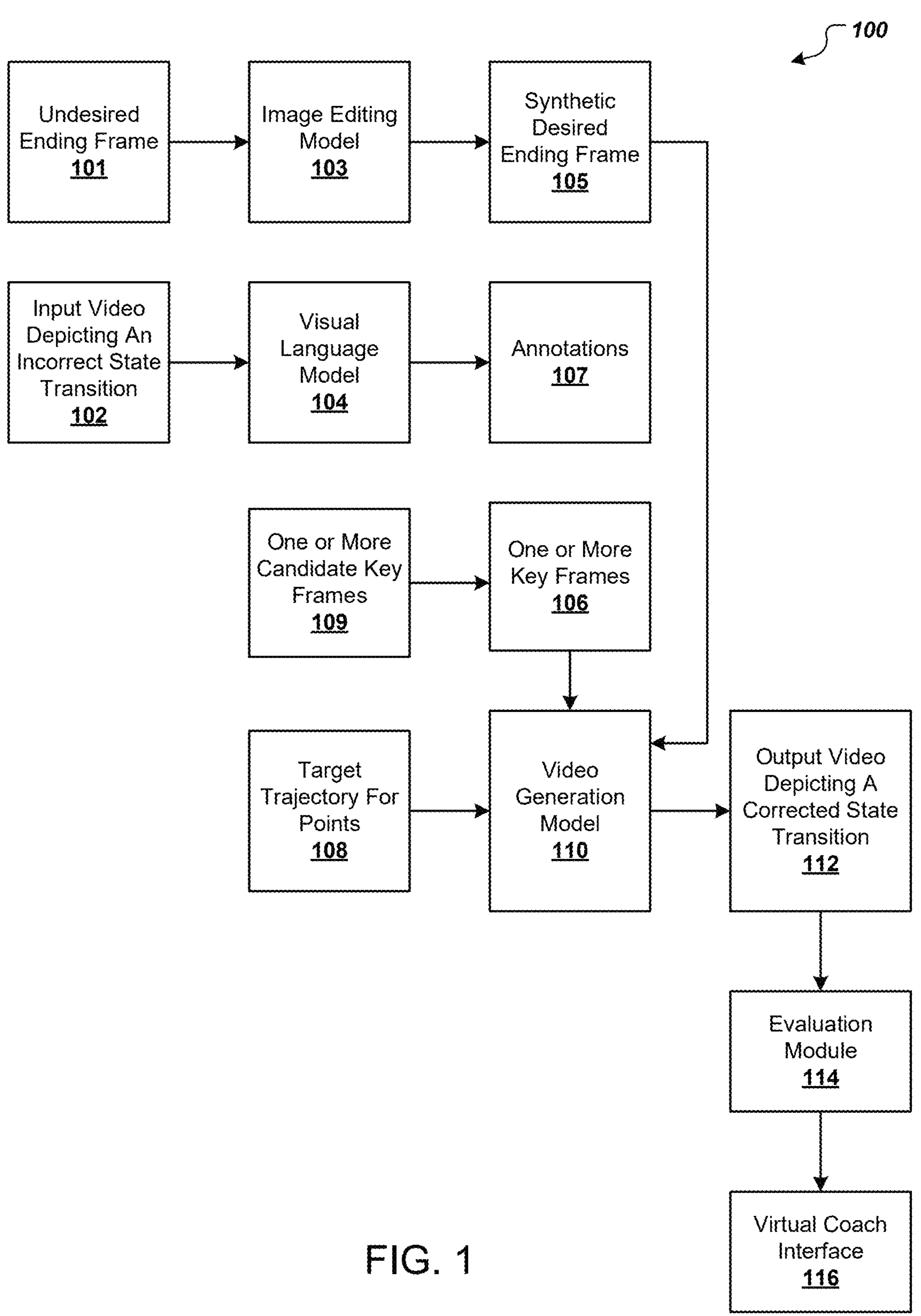
FIG. 1 is a diagram of an example system.

FIG. 1 is a diagram of an example system 100. The system 100 receives an input video 102 depicting an undesired outcome, and uses one or more generative models to process the input video 102 to generate an output video 112 depicting a desired outcome.

The system 100 receives the input video 102 depicting a state transition of an environment. The state transition is a change in the state of the environment that occurs across time, i.e., across multiple time steps. In some implementations, the input video 102 can be a video captured by a camera in the environment. In some implementations, the input video 102 can be a synthetic video generated by a simulator or a machine learning algorithm.

In some implementations, the state transition of the environment can be a state transition of an object in the environment. The state of an object can include a location, an appearance, a behavior, a movement, an interaction with the environment, or other characteristics of the object in the environment.

For example, in autonomous driving, the state transition of the environment can include behaviors of autonomous driving vehicles in challenging environments, such as changing lanes in a busy highway, driving in foggy or icy road conditions, or avoiding an unexpected foreign object on the road.

For example, in robotics, the state transition of the environment can include robot movements and interactions with the environment, such as completing multiple tasks simultaneously or performing movements in a complex environment.

For example, in aviation, the state transition of the environment can include a landing scenario or a takeoff scenario of an aircraft under various conditions in the environment. The conditions can include wind, obstacles, runway conditions, etc. In autonomous vehicle development, the state transition of the environment can include a behavior of self-driving cars in challenging environments. In robotics, the state transition of the environment can include robot movements and interactions with the environment.

The input video 102 includes a sequence of frames depicting a state transition of an environment that does not meet a state transition criterion, e.g., an incorrect or undesired state transition. For example, a user can upload a video of an undesired maneuver of an aircraft for analysis. The undesired maneuver can include an undesired landing or un undesired takeoff of an aircraft.

Figure 5:
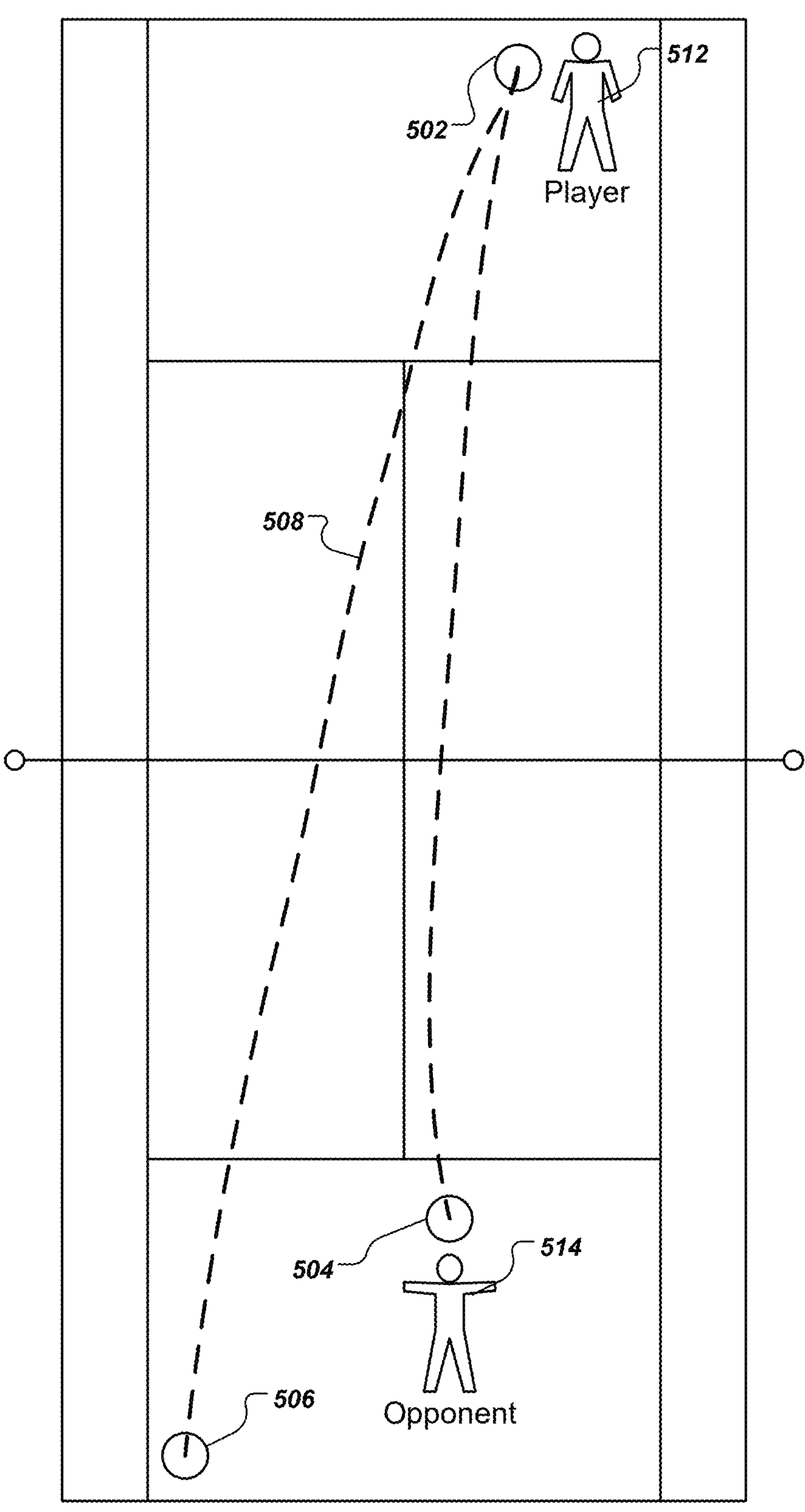
FIG. 5 illustrates an example of simulating how a tennis ball is played in a tennis game.

In some implementations, the systems and techniques can be applicable to sports applications and the state transition can be a movement of a sports equipment (e.g., a tennis ball or a basketball) or the movement of a player (e.g., the movement of a gymnast). FIG. 5 illustrates an example of simulating how a tennis ball is played in a tennis game. The state transition can be a trajectory of a tennis ball 502 in a tennis game, and it might be more desirable for a player 512 hitting the tennis ball into the corner of the court (e.g., the location of the tennis ball 506) on the side of their opponent 514 than right in front of (e.g., the location of the tennis ball 504) the opponent 514.

In some cases, an undesired landing of an aircraft can be a bouncing landing. A bouncing landing happens when an aircraft bounces back into the air one or more times after the initial touchdown. An aircraft can have a bouncing landing if the aircraft lands with excessive vertical speed or if the pilot pushes the nose down too abruptly after touchdown. In some cases, an undesired landing of an aircraft can be porpoising. Porpoising occurs when the aircraft repeatedly touches down noise-first, then tail-first, creating a sequence of oscillations between the nose and the main gear of the aircraft. Porpoising results from incorrect flare timing, excessive air speed, or a high descent rate. In some cases, porpoising can occur in boats and cars. Other undesired landings of an aircraft include floating (e.g., when an aircraft continues to travel horizontally above the runway surface due to excessive air speed), ballooning (e.g., when an aircraft gains altitude unexpectedly caused by flaring too early or with too much force), and landing with excessive drift.

The system 100 includes a visual language model 104. The visual language model 104 processes the input video 102 depicting the incorrect state transition and generates annotations 107 for at least some of the frames in the input video 102. The annotations 107 are labels for the frames in the input video 102. The annotations 107 can include a text in natural language describing the state or one or more features of the environment, an object, or both, depicted in the frame. In some implementations, the visual language model 104 generates annotations 107 for every frame in the input video 102.

The system 100 can provide a text prompt as input to the visual language model 104 and the text prompt can include a request for the visual language model 104 to annotate frames in the input video 102. Instead of relying on human raters, the visual language model 104 can process a sequence of frames in the input video 102 to automatically generate the annotations 107 of the frames.

For example, the system 100 can send a prompt and a frame as inputs to the visual language model 104. The prompt can include a question like this: "Is this an example of a safe landing? If not, provide the reasons why." The visual language model 104 can generate a natural language output including an answer to the question. For example, the natural language output can be "No, the plane is not executing a safe landing. There are many indications of this: (1) The plane is descending at a far too steep of an angle. (2) The plane is coming in way too fast. (3) The plane has not extended its flaps or the landing gear. Any of these factors alone would be an indication of a dangerous landing. When you take them all together, it is clear that this plane is most likely descending into a catastrophic landing."

The visual language model 104 is a generative model. The image editing model 103 and the video generation model 110 to be described below are also generative models.

A generative model is a machine learning (ML) model that generates content, including text, images, audio, or other synthetic data, based on an input. During inference, the generative model can generate a generative output, e.g., a content of a certain type, in response to a query input. In some implementations, the generative model can generate multi-modal outputs, such as an image and a corresponding text describing the image.

In some implementations, the generative model can be configured to process an input sequence of tokens to generate an output sequence of tokens. The tokens can represent any appropriate type of content, e.g., text, image, video, audio, or some combination of the above.

For example, the generative model can be a large language model (LLM) and can be configured to process an input sequence of tokens from a vocabulary of text tokens to generate an output sequence of tokens from the vocabulary.

More generally, the generative model can be any appropriate neural network that receives an input sequence that includes text tokens and auto-regressively generates an output sequence that includes text tokens. For example, the generative model can be a Transformer-based language model neural network or a recurrent neural network-based language model neural network.

In some situations, the generative model can be referred to as an auto-regressive neural network when the neural network used to implement the language model auto-regressively generates an output sequence of tokens. More specifically, the auto-regressively generated output is created by generating each particular token in the output sequence conditioned on a current input sequence that includes any tokens that precede the particular token in the output sequence, i.e., the tokens that have already been generated for any previous positions in the output sequence that precede the particular position of the particular token, and a context input that provides context for the output sequence.

For example, the current input sequence when generating a token at any given position in the output sequence can include the input sequence and the tokens at any preceding positions that precede the given position in the output sequence. As a particular example, the current input sequence can include the input sequence followed by the tokens at any preceding positions that precede the given position in the output sequence. Optionally, the input and the current output sequence can be separated by one or more predetermined tokens within the current input sequence.

More specifically, to generate a particular token at a particular position within an output sequence, the generative model can process the current input sequence to generate a score distribution (e.g., a probability distribution) that assigns a respective score, e.g., a respective probability, to each token in a vocabulary of tokens. The language model neural network can then select, as the particular token, a token from the vocabulary using the score distribution. For example, the neural network of the language model can greedily select the highest-scoring token or can sample, e.g., using nucleus sampling or another sampling technique, a token from the distribution.

As a particular example, the generative model can be an auto-regressive Transformer-based neural network that includes (i) a plurality of attention blocks that each apply a self-attention operation and (ii) an output subnetwork that processes an output of the last attention block to generate the score distribution.

The generative model can have any of a variety of Transformer-based neural network architectures. Examples of such architectures include those described in J. Hoffmann, S. Borgeaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv: 2203.15556, 2022; J. W. Rae, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glaese, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I. Babuschkin, A. Clark, D. de Las Casas, A. Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CoRR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv: 2005.14165, 2020.

In some implementations, the generative model can use a decoder-only architecture that includes many decoder blocks, and without using an encoder. Each decoder block can include a self-attention layer and a feed forward neural network. The transformer-based generative model is an example of a generative model that the systems and techniques herein can be applicable.

More generally, the system and techniques described herein are applicable to other types of generative models. One example of the generative model can be a diffusion model. As another example, the generative model can be a diffusion model that uses a text-to-image diffusion model to generate a first image, and then applies one or more super-resolution diffusion models to generate a final image. As another example, the generative model can be an auto-regressive generative model that auto-regressively generates tokens representing audio, video, images, or other data. As yet another example, the generative model can be a masked token generative model that sequentially unmasks tokens that represent text, video, audio, images, or other data during generation.

In some implementations, the text prompt input to the visual language model 104 can include zero-shot prompting, and the text prompt input may only include instructions for the task to be performed on the input video 102. For example, the prompt can be "Is this an example of a safe landing?"

In some implementations, the text prompt input to the visual language model 104 can include few-shot prompting. The text prompt input can include one or more example images and labels for the example images. For example, a label for an example image can include various tags, such as "shows aircraft, on final, close to the runway, stable approach." For an example image showing a failed landing, the label can include tags, such as "shows aircraft, close to the runway, steep bank, unsafe."

The text prompt input can include an instruction asking the visual language model 104 to generate annotations 107 with tags that are similar to the tags in the labels of the example images. The visual language model can learn features of the example images and their labels and can generate an annotation 107 for an input image frame. For example, annotations for the sequence of the frames can include one or more of: a "shows aircraft" tag, a "close to the runway" tag, a "stable approach" tag, and a "unsafe" tag.

In some implementations, the visual language model 104 can be a general purpose visual language model trained on various types of videos and text data. In some implementations, the visual language model 104 can be generated by fine tuning another trained visual language model on data for a desired application with high quality annotations, resulting in improved performance of the system. For example, the visual language model 104 can be generated by fine tuning a general purpose visual language model on expert verified data for aircraft landing. The expert verified data can have a higher annotation quality than data obtained from the internet, and can be used to improve the performance of the visual language model 104.

In some implementations, the system 100 can use the annotations 107 to determine one or more candidate key frames 109 from the sequence of frames of the input video 102. The one or more candidate key frames 109 can depict a state of the object before, during, and after the state transition. For example, the one or more candidate key frames 109 can depict the model of the aircraft and the runway condition. In some examples, the one or more candidate key frames 109 can depict a state of the aircraft before, during, and after landing. In some implementations, a user or another system can identify the one or more candidate key frames 109.

In some other implementations, the system 100 can receive data identifying the one or more candidate key frames 109 from a user device or another system or another computer.

In some implementations, the system 100 can select one or more key frames 106 from the one or more candidate key frames 109. The system 100 can use the one or more key frames 106 as part of conditioning frames for the video generation model 110 to generate the output video 112, which will be discussed later.

In some implementations, the one or more key frames 106 can include a starting frame depicting the environment before the state transition happens and an ending frame depicting the environment after the state transition ends. For example, the starting frame can be a frame before the aircraft starts landing, and the ending frame can be a frame in which the aircraft has landed. In some implementations, the one or more key frames 106 can include any other temporal sampling scenarios.

For example, using the "show aircraft" tag, the system can identify images containing an aircraft. Using the other tags, the system can identify a sequence of frames in which a stable approach turns into an unsuccessful landing. For the input video 102 depicting an incorrect state transition, the candidate key frames 109 can include: (a) a frame in which the aircraft is visible and stable, (b) the last frame at which the aircraft is not in an upset position yet, (c) the frame in which the landing has gone wrong, and (d) the frame in which the landing has been corrected and the aircraft is safe again.

The system 100 can determine an undesired ending frame 101 from the sequence of frames of the input video 102. The undesired ending frame 101 is a frame from the sequence of frames of the input video 102 that depicts an incorrect ending state of the state transition. For example, the undesired ending frame 101 can depict an unstable landing of an aircraft.

In some implementations, the system 100 can determine the undesired ending frame 101 using annotations 107 for the sequence of frames generated by the visual language model 104. For example, the system can identify the frame in which the landing has gone wrong based on an annotation 107 for the frame that includes "shows aircraft, close to the runway, unsafe landing." The system can determine the frame in which the landing has gone wrong as the undesired ending frame 101.

In some implementations, the system 100 can select the undesired ending frame 101 based on the one or more candidate key frames 109. For example, the candidate key frames 109 can include: (a) a frame in which the aircraft is visible and stable, (b) the last frame at which the aircraft is not in an upset position yet, (c) the frame in which the landing has gone wrong, and (d) the frame in which the landing has been corrected and the aircraft is safe again. The system 100 can select "(c) the frame in which the landing has gone wrong" as the undesired ending frame 101. In some implementations, the system can select a frame that is between the candidate key frame "(c) the frame in which the landing has gone wrong" and the candidate key frame "(d) the frame in which the landing has been corrected and the aircraft is safe again" as the undesired ending frame 101.

In some other implementations, a user or another system can identify the undesired ending frame 101. The system 100 can receive data identifying the undesired ending frame 101 from a user device or another system or another computer.

Based on the undesired ending frame 101, the system 100 can generate a synthetic desired ending frame 105. The synthetic desired ending frame 105 is a synthetic frame that depicts a corrected end state of the state transition. The synthetic desired ending frame 105 meets the state transition criterion. For example, the undesired ending frame 101 can depict an unsafe landing of an aircraft, and the synthetic desired ending frame 105 can depict a safe landing of an aircraft.

In some implementations, the system can use an image editing model 103 to process the undesired ending frame 101 that does not meet a state transition criterion to generate a synthetic desired ending frame 105 that meets the state transition criterion.

The image editing model 103 can be a generative model (as described above in connection with the visual language model 104) that generates an image based on text data in the descriptive prompts. Examples of image editing models include Ling, Huan, et al. "Editgan: High-precision semantic image editing." Advances in Neural Information Processing Systems 34 (2021): 16331-16345; and Avrahami, Omri, Dani Lischinski, and Ohad Fried. "Blended diffusion for text-driven editing of natural images." Proceedings of the IEEE/CVF conference on computer vision and pattern recognition. 2022.

For example, the undesired ending frame 101 can depict a bouncing landing that happens when the pilot pushes the nose down too abruptly after touchdown. The system 100 provides a text prompt to the image editing model 103 that describes a desired smooth landing that happens without bouncing. The image editing model 103 can learn features from the bounding landing frame 101 and use the learned features to generate a synthetic ending frame 105. The synthetic frame depicts the same aircraft in the same environment as depicted in the frame 101. In addition, the image editing model 103 can adjust the aircraft's position relative to the ground. The synthetic ending frame 105 depicts an aircraft position corresponding to a situation when the pilot does not push the nose down too abruptly after touchdown, resulting in a smooth landing instead of a bouncing landing.

In some implementations, the prompt for the image editing model 103 can include a summary of an annotation of the undesired ending frame 101, a request to correct the undesired state transition, or both. For example, the prompt can include an annotation of the undesired ending frame 101 generated by the visual language model 104 and the annotation can describe what is wrong with the landing flare. The prompt can also include a meta prompt to correct for the landing flare. As another example, if the undesired ending frame 101 depicts that the wings were not level after touchdown, the prompt can include a request to ask the image editing model 103 to "align the wings to be level with the ground," and the the image editing model 103 can generate the synthetic desired ending frame 105 that depicts wings being aligned to be level with the ground.

In some implementations, the system 100 can provide the output of the image editing model 103 to the visual language model 104 to verify whether the output depicts a desired ending frame of the state transition. In some implementations, the system 100 can generate the synthetic desired ending frame 105 in multiple iterations until the visual language model 104 accepts the synthetic desired ending frame 105.

For example, at each iteration, the image editing model 103 can edit an image of an incorrect landing based on the annotation generated by the visual language model 104 describing how the image can be corrected. The image editing model 103 can generate an edited image at the current iteration. The visual language model 104 can process the edited image at the current iteration and can determine whether to accept or reject the edited image at the current iteration, and optionally with an explanation for accepting or rejecting the edited image. If the edited image at the current iteration is rejected, the image editing model can re-process the image of the incorrect landing to generate an edited image at the next iteration, e.g., based on the explanation for rejecting the edited image at the current iteration. The visual language model 104 can process the edited image at the next iteration to provide feedback. The process continues until the edited image is accepted or until a predetermined number of iterations is reached.

The system 100 provides one or more key frames 106 and the synthetic desired ending frame 105 as input frames to a video generation model 110. The system can provide a text prompt input to the video generation model 110 that requests the video generation model 110 to process the input frames and generates an output video 112 depicting a corrected state transition conditioned on the input frames. The video generation model 110 can generate the output video 112 depicting a synthetic state transition of the environment that meets the state transition criterion.

For example, the one or more key frames 106 can include a starting frame depicting the environment before the landing happens. The synthetic desired ending frame 105 can depict a safe landing of the aircraft. The video generation model 110 can generate an output video 112 that starts with the starting frame and ends with the synthetic desired ending frame. That is, the video generation model 110 generates the intermediate frames between the starting frame and the synthetic desired ending frame.

The video generation model 110 is a generative model (as described above in connection with the visual language model 104) that generates a video conditioned on the input frames (e.g., the one or more key frames 106 and the synthetic desired ending frame 105) and based on text prompt input. The one or more key frames 106 and the synthetic desired ending frame 105 are conditioning frames to the video generation model 110. The video generation model 110 can process the one or more conditioning frames to generate an output video 112 depicting a corrected state transition according to the conditioning frames.

In some implementations, the video generation model 110 can be a video diffusion model and the video generation model 110 can implement image conditioning using a partial denoising method. In general, diffusion models can use noise latent tokens that represent initial random noise in the latent space of the diffusion model. The diffusion models gradually refine the noise latent tokens through a series of steps to produce a coherent output, such as an image or a video.

The video generation model 110 can process the conditioning frames to generate conditioning image tokens. The video generation model 110 can combine (e.g., sum) the conditioning image tokens with noise latent tokens, and then can provide the combined (e.g., summed) tokens to one or more transformer blocks in the video generation model 110. The video generation model 110 can learn to perform partial denoising using the conditioning image tokens generated from the conditioning frames. Thus, the output video 112 can depict good spatial and temporal alignment relative to the input video 102.

In some implementations, the one or more key frames 106 that are provided as input to the video generation model 110 can include a transition frame. The state transition of the environment depicted in the transition frame and frames in the input video 102 that are before the transition frame satisfies the state transition criterion, and the state transition of the environment depicted in frames in the input video after the transition frame does not satisfy the state transition criterion. For example, the transition frame can be "(b) the last frame at which the aircraft is not in an upset position yet" that is identified using the annotations 107.

In some implementations, the one or more key frames 106 that are provided as input to the video generation model 110 can include one or more frames that precede the transition frame. For example, the one or more key frames 106 can include a starting frame depicting the environment before the state transition happens, e.g., before landing happens.

In some implementations, the one or more key frames 106 that are provided as input to the video generation model 110 can include both the transition frame and one or more frames that precede the transition frame.

In some implementations, the input to the video generation model 110 can further include a target trajectory 108 for a set of points in the input video 102, e.g., point track data. The set of points can be a set of points on an object of interest in one of the key frames 106.

Figure 4:
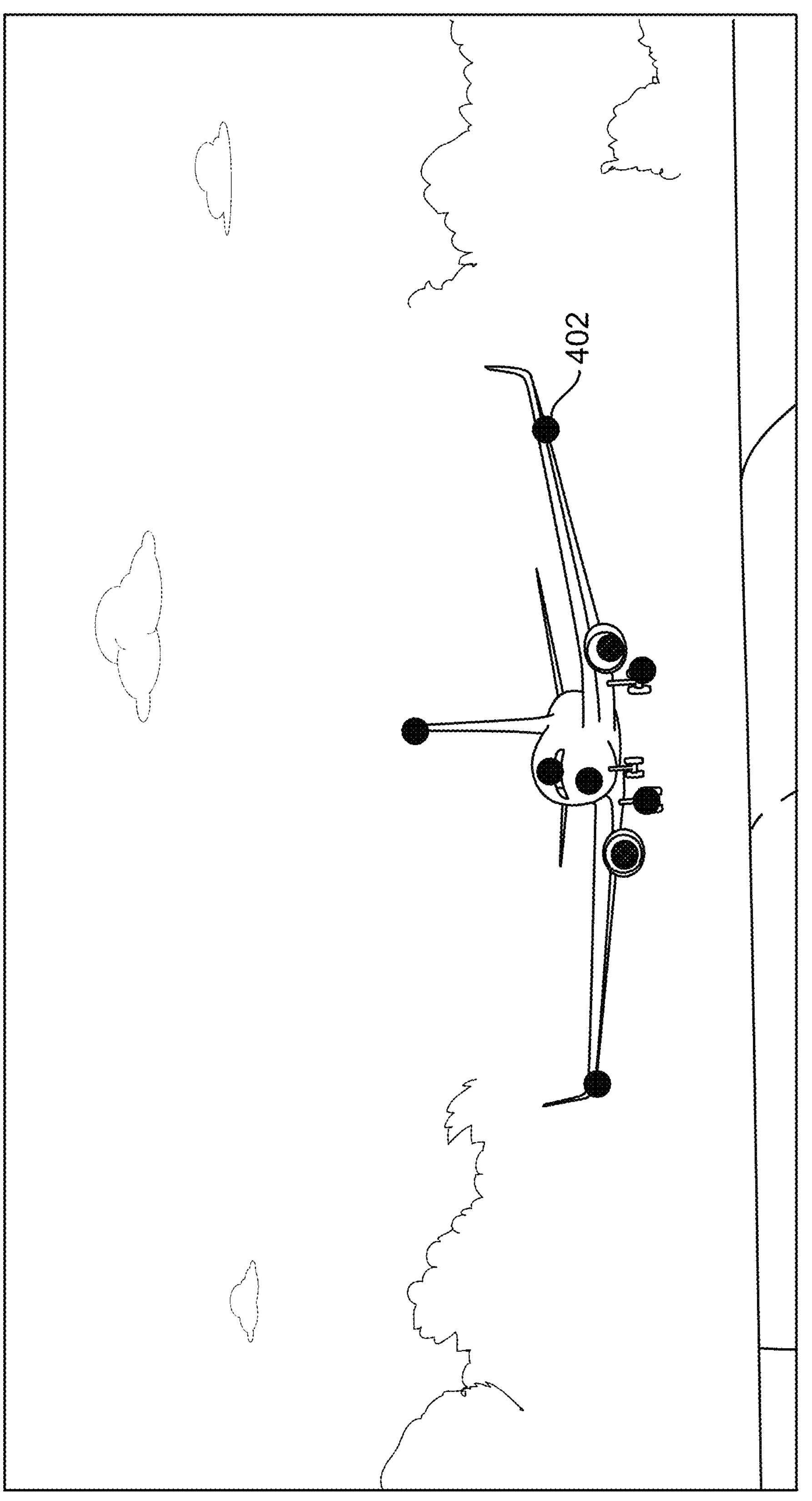
FIG. 4 illustrates an example of a set of points for point tracking.

For example, the one or more key frames 106 can include a starting frame depicting the environment before the state transition happens. The system 100 can obtain a set of points on the starting frame. FIG. 4 illustrates an example of a set of points for point tracking. The set of points include nine points on various locations of the aircraft. The set of points include a point 402 on the left wing of the aircraft and other points on various locations of the aircraft.

The system can obtain a target trajectory for the set of points associated with a target condition of the environment. For example, the target trajectory can be associated with various conditions like wind, obstacles, and runway conditions. The target trajectory 108 can include a respective target trajectory for each point in the set of points. For example, the target trajectory can be a trajectory for a set of points in the frames of a video that depicts a smooth landing of an aircraft.

In some implementations, the system 100 can generate the target trajectory for the set of points using a point tracking model. A point tracking model can track a query point in a video sequence. For example, the point tracking model can be the Tapir model as described in Doersch, Carl, et al. "Tapir: Tracking any point with per-frame initialization and temporal refinement." Proceedings of the IEEE/CVF International Conference on Computer Vision. 2023. The system 100 can run the point tracking model on videos depicting state transitions that meet the state transition criterion to generate a set of desired trajectories.

In some implementations, the system 100 can obtain target trajectories previously generated before the real-time processing of the input video 102. The point tracking model can run offline on videos depicting state transitions that meet the state transition criterion to generate a set of desired trajectories.

In some implementations, the system 100 can generate the target trajectory 108 using a physics engine and the target trajectory can follow the rules of the physics. The physics engine can be a game engine or a physics simulator, such as MuJuCo (https://mujoco.org/).

The video generation model 110 can process the input including the one or more key frames 106, the synthetic desired ending frame 105, and the target trajectory 108 to generate the output video 112. Thus, video generation model 110 generates the output video 112 conditioned on the conditioning frame that includes: the one or more key frames 106, the synthetic desired ending frame 105, and the target trajectories 108.

In some implementations, the video generation model 110 can be a video diffusion model. To implement the conditioning on the target trajectory 108, the video generation model 110 can project the point track data depicting the relative movements for the set of points as point track tokens. The video generation model 110 can combine (e.g., sum) the point track tokens with the other latent tokens, such as the noise tokens and the conditioning image tokens. The video generation model 110 can provide the combined tokens to one or more transformer blocks in the video generation model 110. The video generation model 110 can learn the desired relative movements for the set of points as provided in the point track tokens while performing the denoising using the video diffusion model to generate the output video 112.

For example, the one or more key frames 106 can include the starting frame depicting the environment before the state transition happens. The video generation model 110 can process the input including (i) the starting frame, (ii) the synthetic ending frame 105, and (iii) the target trajectory 108 for the set of points, to generate the output video 112 that meets the state transition criterion. The output video 112 is conditioned on the starting frame, the synthetic ending frame, and the target trajectory for the set of points. The first frame of the output video 112 is the starting frame. The last frame of the output video is the synthetic ending frame. The locations for the set of points in at least some frames of the output video 112 approximately follow the target trajectory 108.

Some video generation models 110 can generate an output video that has a frame that appears to change the object, the camera pose, the environment, or a combination of these. In some implementations, to account for this, the system 100 can include an evaluation module 114. The evaluation module 114 can generate an evaluation result for the output video 112. The system 100 can use the evaluation module 114 to assess the quality of the generated output video 112 before using the output video 112 in a subsequent processing, e.g., sharing the output video 112 with a user. The evaluation module 114 can detect discontinuity in the output video 112, can determine whether the output video 112 satisfies one or more laws of physics, or other errors or abnormalities in the output video 112.

In some implementations, the evaluation module 114 can use a point track model to evaluate the output video 112. The evaluation module 114 can obtain a set of points on an object in the environment on a frame, e.g., a starting frame, of the output video 112. The evaluation module 114 can process the output video 112 using a point tracking model to generate trajectories for the set of points in the output video 112, e.g., the point tracks. The evaluation module 114 can generate an evaluation result for the output video 112 based on the trajectories for the set of points in the output video.

In some implementations, the evaluation module 114 can determine that at least one trajectory of the trajectories for the set of points in the output video is discontinuous. In response to determining that at least one trajectory of the trajectories for the set of points in the output video is discontinuous, the evaluation module 114 can generate the evaluation result for the output video 112 indicating that the output video 112 has an error.

For example, in the aircraft landing scenario, there is a single camera that captures the video and there is a single key object (the aircraft) in the foreground of the video. For a realistic video, the trajectories for the set of points on the aircraft are guaranteed to be continuous. Thus, if one trajectory for the set of points is disjoint, the system 100 can determine that there is a high likelihood that the output video 112 has disjoint frames or external objects occluding the aircraft depicted in the output video 112.

In some implementations, the evaluation module 114 can determine a difference value between the trajectories for the set of points in the output video 112 and reference trajectories for the set of points generated by a simulation engine that is based on one or more laws of physics. In some implementations, the simulation engine based on the one or more laws of physics can be a game engine or a physics simulator, such as MuJuCo (https://mujoco.org/). The evaluation module 114 can determine whether the trajectories for the set of points in the output video 112 satisfy the one or more laws of physics based on whether the difference value is less than a threshold.

In some implementations, the system can calculate the sum of the L1 distances or the sum of the L2 distances between the trajectories for the set of points in the output video 112 and reference trajectories for the set of points generated by a simulation engine. If the sum is less than a predetermined threshold, the system can determine that the output video is realistic. If the sum is not less than a predetermined threshold, the system can determine that the output video has an error.

For example, the airplane has a rigid body that cannot be deformed. The video of the landing of the airplane does not have any occlusions or changes in camera pose. Thus, a realistic video is guaranteed to have a trajectory of point tracks that follow the laws of physics. The system can use the trajectories of rigid bodies under motion to evaluate the output video. The system can measure the sum of the L1 or L2 distance of point tracks of the airplane in the output video and point tracks of a rigid object generated by a physics engine. If the sum is less than a predetermined threshold, the system can determine that the output video is realistic. If the sum is not less than a predetermined threshold, the system can determine that the output video has an error.

For example, the physics engine can provide an interface to create environments and landing maneuvers and a user of the physics engine can program the trajectory of an airplane based on the desired scenario. In some implementations, the system can use the physics engine to simulate a flying object (e.g., drones or airplanes), and the system can programmatically instruct the physics engine to generate a landing pattern for the flying object. The system can use the landing pattern, e.g., as a programmatic input, to create a three-dimensional (3D) simulation of the flying object. The system can provide the video of the 3D simulation to the point tracking algorithm to generate viable point tracks for the object under motion.

The system 100 can use the output video 112 in a subsequent application. For example, the system 100 can use the output video 112 for training, learning, planning, decision-making, or problem-solving.

In some implementations, the system 100 can determine to use the output video 112 in an application if the evaluation result generated by the evaluation module 114 satisfies an evaluation criterion. For example, if the evaluation result indicates that the output video 112 is continuous and satisfies one or more laws of physics, the system 100 can determine to use the output video 112 in a subsequent application.

In some implementations, the system 100 can determine to not use the output video 112 in an application if the evaluation result generated by the evaluation module 114 does not satisfy an evaluation criterion. For example, if the evaluation result indicates that at least one trajectory of the trajectories for the set of points in the output video is discontinuous or does not satisfy one or more laws of physics, the system 100 can determine to not use the output video 112 in a subsequent application. In some implementations, the system 100 can send a notification to a user device such that the user can review the output video 112.

In some implementations, the system 100 can display the output video 112 in a user interface of a computer. For example, the system 100 can display the output video 112 in a virtual coach interface 116. In some implementations, the virtual coach interface 116 can provide a side-by-side comparison of the input video 102 depicting the state transition that does not meet a state transition criterion and the output video 112 depicting a corrected state transition. The side-by-side comparison can provide effective feedback and analysis and can improve training effectiveness. For example, the system 100 can display side by side of a failed landing and a safe landing of an aircraft, and a learner can learn that in order to avoid bouncing landing, they need to control the vertical speed and avoid pushing the nose down too abruptly after touchdown.

Although the description above has described the operation of the system 100 when generating videos of the landing of an aircraft, the systems, methods, and techniques described herein are applicable to other applications or environments. In particular, the systems, methods, and techniques described herein are applicable to any type of state transitions, such as any possible maneuvers of robots, cars, trucks, boats, airplanes, drones, people, objects in sports applications, and any other objects. In some implementations, the systems and techniques described herein can be applicable to tasks where dexterity in a short time interval is important, with a high computation cost associated with repeated simulations or human repetitions. In some examples, the systems and techniques can be used to generate videos for complex maneuvers in traffic while driving a vehicle or a bike (e.g., across a traffic intersection), an underwater vehicle, or an automobile in automotive sports.

For example, the system 100 can generate, based on an input video of a failed trick performed by a skateboarder, an output video depicting a trick successfully performed by a skateboarder in the same environment as depicted in the input video. The system 100 can show the output video to a skateboard learner such that the skateboard learner can learn when the trick went wrong and what adjustments are needed to perform the trick successfully.

FIG. 5 illustrates an example of simulating how a tennis ball is played in a tennis game. Given an input video depicting a desired output, e.g., an opponent 514 not being able to get a tennis ball 502 that a player 512 plays in a tennis match/game, the systems and techniques can generate a video depicting a trajectory 508 of the tennis ball 506 showing how far to one side the tennis ball 506 needs to be played for the opponent 514 to be unable to get it.

In some implementations, given an input video depicting an undesired output, e.g., the opponent 514 being able to get the tennis ball 504, the systems and techniques can generate a video depicting a trajectory 508 of the tennis ball 506 depicting a desired output, e.g., the opponent 514 not being able to get a tennis ball 506. For example, the system can determine an undesired ending frame 101 being an image depicting that the tennis ball 504 arrives right in front of the opponent 514. The image editing model 103 can generate a synthetic desired ending frame 105 depicting that the tennis ball 506 arrives at the corner of the court, where it is much harder for the opponent 514 to return the tennis ball 506 to the side of player 512. The video generation model 110 can generate a video depicting a trajectory 508 of the tennis ball 506 that arrives at the corner of the court, control data (e.g., how the player 512 should position the tennis racket, the strength and direction of hitting the tennis ball 502, or a trajectory of the racket), or a combination of both. The system can show the synthetic video of these winning plays of tennis to a user, e.g., a tennis student, such that the user can learn from these winning plays. In some implementations, the system can show the control data (e.g., how the player should position the tennis racket, the strength and direction of hitting the tennis ball 502, or a trajectory of the racket) to the user such that the user can learn how to play the tennis ball such that the opponent would be unable to get it.

FIGS. 2A-2D illustrates generating a corrected simulation of an aircraft landing using a video generation model. FIG. 2A illustrates an example starting frame of an input video. In the starting frame, the aircraft is visible and stable. FIG. 2B illustrates an example ending frame depicting an undesired landing of an aircraft. For example, the aircraft is descending at a far too steep of an angle, causing bouncing landing or porpoising.

To direct the video generation model 110 towards outputting a successful landing, the system 100 conditioned the video generation model 110 on the starting frame in FIG. 2A and a synthetic ending frame in FIG. 2C. FIG. 2C illustrates an example synthetic ending frame depicting a desired landing of an aircraft. The system 100 can generate the synthetic ending frame using an image editing model 103 as described herein in FIG. 1. The system 100 provides the starting frame in FIG. 2A and the synthetic ending frame in FIG. 2C as inputs to the video generation model 110.

The video generation model 110 generates an output video 112 that starts at the starting frame and ends at the synthetic ending frame. The output video 112 includes a sequence of intermediate frames depicting the aircraft's transition from the starting frame to the ending frame. FIG. 2D illustrates an example intermediate frame of the output video 112 generated by the video generation model 110 conditioned on the starting frame in FIG. 2A and the synthetic ending frame in FIG. 2C. The one or more intermediate frames can depict ways a pilot can control the aircraft such that the aircraft can have a desired successful landing.

FIG. 3 is a flow chart of an example process 300 for generating corrected video simulation using video generation models. The process 300 will be described as being performed by an appropriately programmed computer system, such as the system 100.

The system obtains an input video including a sequence of frames depicting a state transition of an environment that does not meet a state transition criterion (302). In some implementations, the state transition of the environment can include a landing or a takeoff of an aircraft.

The system generates, based on a frame from a sequence of frames that depicts an incorrect end state of the state transition, a synthetic ending frame depicting a corrected end state of the state transition (304). In some implementations, the system can process an input including at least the frame that depicts the incorrect end state of the state transition using an image editing model to generate the synthetic ending frame depicting the corrected end state of the state transition.

The system processes an input including one or more key frames from sequence of frames of the input video and the synthetic ending frame depicting the corrected end state of the state transition using a video generation model to generate an output video depicting a synthetic state transition of the environment that meets the state transition criterion (306).

In some implementations, the system can process the sequence of the frames of the input video using a visual language model to generate a respective state annotation for each frame in the sequence of the frames of the input video. The system can determine the one or more key frames from the sequence of the frames of the input video based on the respective state annotations for the sequence of the frames of the input video.

In some implementations, the sequence of the frames of the input video can include a transition frame. The state transition of the environment depicted in the transition frame and frames in the input video before the transition frame meets the state transition criterion, and the state transition of the environment depicted in frames in the input video after the transition frame does not meet the state transition criterion.

In some implementations, the input to the video generation model can include the transition frame. For example, the one or more key frames provided to the video generation model can include the transition frame. In some implementations, the input to the video generation model can include one or more frames that precede the transition frame. For example, the one or more key frames provided to the video generation model can include one or more frames that precede the transition frame.

In some implementations, the one or more key frames can include a starting frame depicting the environment before the state transition happens. The system can obtain a set of points on the starting frame. The system can obtain a target trajectory for the set of points associated with a target condition of the environment. The system can process the input including the starting frame, the synthetic ending frame, and the target trajectory for the set of points using the video generation model to generate the output video that meets the state transition criterion and is conditioned on the starting frame, the synthetic ending frame, and the target trajectory for the set of points. The first frame of the output video is the starting frame. The last frame of the output video is the synthetic ending frame. The locations for the set of points in at least some frames of the output video approximately follow the target trajectory.

In some implementations, when generating the output video using the video generation model, the system can adjust one or more hyperparameters of the video generation model. In some implementations, the system can adjust a classifier-free guidance (CFG) scale to control the level of influence of the conditioning images. For example, the system can control the level of influence the one or more key frames and the synthetic ending frame have on the output video. The system can increase the value of the CFG to improve the quality of the output video.

The CFG is a parameter in generative models that controls how much influence the input prompt has over the generative output generated by the generative model.

In some implementations, when using CFG, the system can also process one or more additional diffusion inputs for the updating iteration to generate a respective additional denoising output for the updating iteration for each additional diffusion input.

Each additional diffusion input also includes the current data item as of the updating iteration but includes a different conditioning input.

For example, one of the additional diffusion inputs can be an unconditional diffusion input that includes a representation of a conditioning input that has been designated to indicate that the data item should be generated unconditionally (i.e., without conditioning on another conditioning input). For example, the representation of a conditioning input that has been designated to indicate that the data item should be generated unconditionally can be a predetermined, fixed embedding, e.g., an embedding that includes all zeros.

As another example, one of the additional diffusion inputs can be a negative diffusion input that includes a representation of a negative conditioning input that indicates properties that the generated data item should not have.

That is, the system can also receive a negative conditioning input that indicates properties that the generated data item should not have and can include a representation of the negative conditioning input, e.g., one or more embeddings generated from the negative conditioning input, in the negative diffusion input.

Each additional denoising output defines a prediction, given the corresponding additional denoising input, of the residual error, i.e., the difference, between the noise component of the current data item and the analytic estimate of the noise component.

The system determines a final denoising output for the updating iteration from the first denoising output and, when generated, the additional denoising output(s).

When no additional denoising outputs are generated, the system can set the final denoising output equal to the first denoising output.

When one or more additional denoising outputs are generated, the system can combine the first denoising output and the final denoising outputs in accordance with a guidance weight w for the updating iteration. The guidance weight can be used to adjust the relative contributions of the first denoising output and the additional denoising output(s) to the final denoising output, For example, the system can set the final denoising output equal to (1+w)* the first denoising output −w* the additional denoising output or, when there are multiple additional denoising outputs, the sum of the additional denoising outputs (where * denotes the multiplication operator). That is, the final denoising output can be determined from a difference between the first denoising output scaled by (1+w) and the sum of the one or more additional denoising outputs scaled by w.

In some implementations, the system can adjust the number of repeated latent variables in an autoencoder in order to increase the frame rate of the output video. For example, one latent frame can correspond to a predetermined number of, e.g., eight or sixteen, frames in the output video, and the system can increase the number of latent frames in order to increase the frame rate of the output video.

In some implementations, the system can obtain a set of points on an object in the environment on a starting frame of the output video. The system can process the output video using a point tracking model to generate trajectories for the set of points in the output video. The system can generate an evaluation result for the output video based on the trajectories for the set of points in the output video.

In some implementations, generating the evaluation result for the output video can include determining that at least one trajectory of the trajectories for the set of points in the output video is discontinuous, and in response to determining that at least one trajectory of the trajectories for the set of points in the output video is discontinuous, generating the evaluation result for the output video indicating that the output video has an error.

In some implementations, generating the evaluation result for the output video can include determining a difference value between the trajectories for the set of points in the output video and reference trajectories for the set of points generated by a simulation engine that is based on one or more laws of physics, and determining whether the trajectories for the set of points in the output video meet the one or more laws of physics based on whether the difference value is less than a threshold.

In some implementations, the system can generate control data for controlling one or more objects in the environment that causes the one or more objects to follow respective trajectories for each of the one or more objects depicted in the output video. In some implementations, the system can process the output video using a point tracking model to generate trajectories for the set of points on an object of interest in the output video. The system can determine control data that includes a sequence of actions that can result in the corrected state transition as depicted in the output video.

For example, in aviation, a pilot or a controller of an aircraft can use flight controls (e.g., ailerons and rudder) to control yaw, pitch, and roll of the aircraft. The system can generate control data for the ailerons and rudder that can be used to control the yaw, pitch, and roll of the aircraft. For example, if the aircraft is not aligned with the centerline of the runway while landing, e.g., approximately one meter from touchdown, the system can determine control data for an aileron, e.g., turning the aileron right to bring the aircraft back towards the centerline. The system can use the control data for the aileron for controlling drift. In some implementations, the system can use control data for the aileron and control data for the rudder to keep the nose of the aircraft aligned.

In some implementations, the system can provide the trajectories for the set of points on the object of interest to a physics engine. The physic engine can automatically convert the trajectories into actions that can result in the corrected state transition as depicted in the output video.

For example, the physics engine can provide a programmatic interface to create trajectories and actions. An action be "move left" or "turn 90 degrees clockwise along the x-axis." The physics engine can use a sequence of actions to create a trajectory of a rigid body. Because the physics engine has access to both the trajectory and the sequence of actions that created the trajectory, after receiving target trajectories from the system, the physics engine can provide, to the system, actions corresponding to the target trajectories.

In some implementations, the system or a machine learning training system can train the video generation model to generate both an output video and control actions that can result in the corrected state transition in the output video. In some implementations, the video generation model can generate multi-modal outputs, such as the output video and a corresponding text describing the control actions that can result in the corrected state transition in the output video.

In some implementations, the video generation model can take, as input, discrete (e.g., one hot encoded) actions or learned latent actions (e.g., learned representations of discrete actions). The system can provide the action tokens (e.g., the discrete actions or the learned latent actions) as additional conditioning signals to the video generation model. The system can train the model with a training dataset of videos of objects in motion along with the sequence of actions that led to an object's motion. The system can provide the sequence of actions as conditioning signals when training the model. At inference time, the system can provide the starting image latents and the starting action token to the video generation model, along with the prompt for the corrected generation. The system can convert (e.g., de-tokenize) the sequence of action tokens generated by the model to their corresponding text.

For example, pilots use airplane flaps to increase lift during takeoff and maintain lift at lower speeds during landing. The flap setting determines whether the flaps increase lift or drag. For example, during takeoff, pilots can use flaps to increase lift, and then retract the flaps after liftoff to avoid drag. During landing, pilots can use flaps to increase drag, which helps slow the plane and allows for a steeper approach. The trained video generation model can generate the output video and the flap setting that can be controlled by a pilot to generate the desired state transition as depicted in the output video.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:

obtaining an input video comprising a sequence of frames depicting a state transition of an environment that does not meet a state transition criterion;

generating, based on a frame from a sequence of frames that depicts an incorrect end state of the state transition, a synthetic ending frame depicting a corrected end state of the state transition; and processing an input comprising one or more key frames from sequence of frames of the input video and the synthetic ending frame depicting the corrected end state of the state transition using a video generation model to generate an output video depicting a synthetic state transition of the environment that meets the state transition criterion.

2. The method of claim 1, comprising:

processing the sequence of the frames of the input video using a visual language model to generate a respective state annotation for each frame in the sequence of the frames of the input video; and determining the one or more key frames from the sequence of the frames of the input video based on the respective state annotations for the sequence of the frames of the input video.

3. The method of claim 1, wherein the sequence of the frames of the input video comprises a transition frame, wherein the state transition of the environment depicted in the transition frame and frames in the input video before the transition frame meets the state transition criterion, and the state transition of the environment depicted in frames in the input video after the transition frame does not meet the state transition criterion.

4. The method of claim 3, wherein the input to the video generation model comprises the transition frame.

5. The method of claim 3, wherein the input to the video generation model comprises one or more frames that precede the transition frame.

6. The method of claim 1, comprising:

processing an input comprising at least the frame that depicts the incorrect end state of the state transition using an image editing model to generate the synthetic ending frame depicting the corrected end state of the state transition.

7. The method of claim 1, wherein the one or more key frames comprise a starting frame depicting the environment before the state transition happens, and the method comprises:

obtaining a set of points on the starting frame;

obtaining a target trajectory for the set of points associated with a target condition of the environment; and processing the input comprising the starting frame, the synthetic ending frame, and the target trajectory for the set of points using the video generation model to generate the output video that meets the state transition criterion and is conditioned on the starting frame, the synthetic ending frame, and the target trajectory for the set of points, wherein a first frame of the output video is the starting frame, a last frame of the output video is the synthetic ending frame, and locations for the set of points in at least some frames of the output video approximately follow the target trajectory.

8. The method of claim 1, further comprising:

generating control data for controlling one or more objects in the environment that causes the one or more objects to follow respective trajectories for each of the one or more objects depicted in the output video.

9. The method of claim 1, wherein the state transition of the environment comprises a landing or a takeoff of an aircraft.

10. The method of claim 1, further comprising:

obtaining a set of points on an object in the environment on a starting frame of the output video;

processing the output video using a point tracking model to generate trajectories for the set of points in the output video; and generating an evaluation result for the output video based on the trajectories for the set of points in the output video.

11. The method of claim 10, wherein generating the evaluation result for the output video comprises:

determining that at least one trajectory of the trajectories for the set of points in the output video is discontinuous; and in response to determining that at least one trajectory of the trajectories for the set of points in the output video is discontinuous, generating the evaluation result for the output video indicating that the output video has an error.

12. The method of claim 10, wherein generating the evaluation result for the output video comprises:

determining a difference value between the trajectories for the set of points in the output video and reference trajectories for the set of points generated by a simulation engine that is based on one or more laws of physics; and determining whether the trajectories for the set of points in the output video meet the one or more laws of physics based on whether the difference value is less than a threshold.

13. A system comprising one or more computers and one or more storage devices storing instructions that are operable, when executed by the one or more computers, to cause the one or more computers to perform operations comprising:

obtaining an input video comprising a sequence of frames depicting a state transition of an environment that does not meet a state transition criterion;

generating, based on a frame from a sequence of frames that depicts an incorrect end state of the state transition, a synthetic ending frame depicting a corrected end state of the state transition; and processing an input comprising one or more key frames from sequence of frames of the input video and the synthetic ending frame depicting the corrected end state of the state transition using a video generation model to generate an output video depicting a synthetic state transition of the environment that meets the state transition criterion.

14. The system of claim 13, wherein the operations comprise:

processing the sequence of the frames of the input video using a visual language model to generate a respective state annotation for each frame in the sequence of the frames of the input video; and determining the one or more key frames from the sequence of the frames of the input video based on the respective state annotations for the sequence of the frames of the input video.

15. The system of claim 13, wherein the sequence of the frames of the input video comprises a transition frame, wherein the state transition of the environment depicted in the transition frame and frames in the input video before the transition frame meets the state transition criterion, and the state transition of the environment depicted in frames in the input video after the transition frame does not meet the state transition criterion.

16. The system of claim 15, wherein the input to the video generation model comprises the transition frame.

17. The system of claim 15, wherein the input to the video generation model comprises one or more frames that precede the transition frame.

18. The system of claim 13, wherein the operations comprise:

processing an input comprising at least the frame that depicts the incorrect end state of the state transition using an image editing model to generate the synthetic ending frame depicting the corrected end state of the state transition.

19. The system of claim 13, wherein the one or more key frames comprise a starting frame depicting the environment before the state transition happens, and the operations comprise:

obtaining a set of points on the starting frame;

obtaining a target trajectory for the set of points associated with a target condition of the environment; and processing the input comprising the starting frame, the synthetic ending frame, and the target trajectory for the set of points using the video generation model to generate the output video that meets the state transition criterion and is conditioned on the starting frame, the synthetic ending frame, and the target trajectory for the set of points, wherein a first frame of the output video is the starting frame, a last frame of the output video is the synthetic ending frame, and locations for the set of points in at least some frames of the output video approximately follow the target trajectory.

20. One or more non-transitory storage media encoded with instructions that when executed by a computing device cause the computing device to perform operations comprising:

obtaining an input video comprising a sequence of frames depicting a state transition of an environment that does not meet a state transition criterion;

generating, based on a frame from a sequence of frames that depicts an incorrect end state of the state transition, a synthetic ending frame depicting a corrected end state of the state transition; and processing an input comprising one or more key frames from sequence of frames of the input video and the synthetic ending frame depicting the corrected end state of the state transition using a video generation model to generate an output video depicting a synthetic state transition of the environment that meets the state transition criterion.

* * * * *